Jan. 9, 1951     R. A. HUMPHREY     2,537,587
LUGGAGE CARRIER FOR AUTOMOBILES
Filed Jan. 16, 1948     2 Sheets-Sheet 1
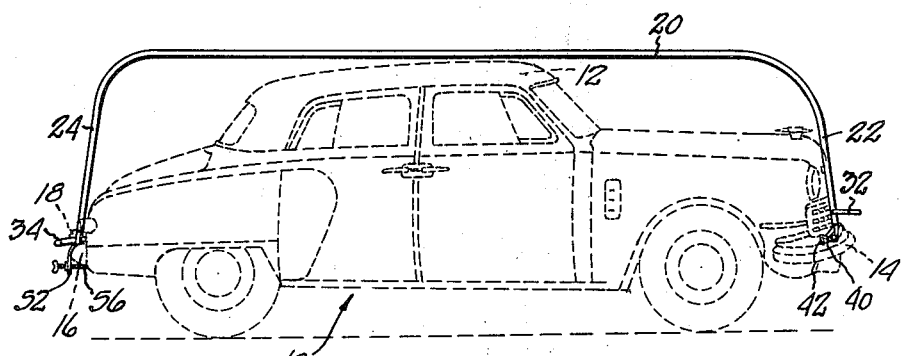
Fig. 1
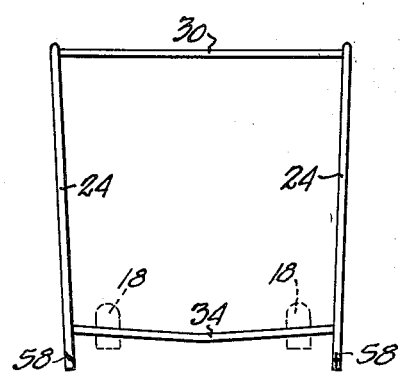
Fig. 4
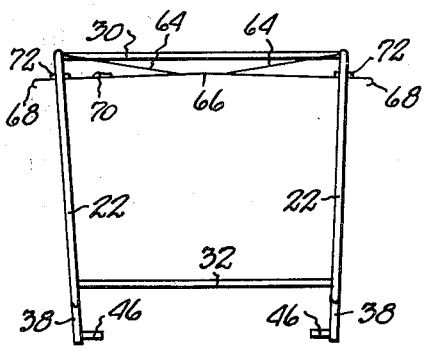
Fig. 5
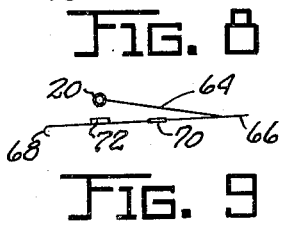
Fig. 8
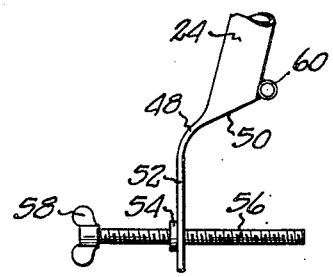
Fig. 6
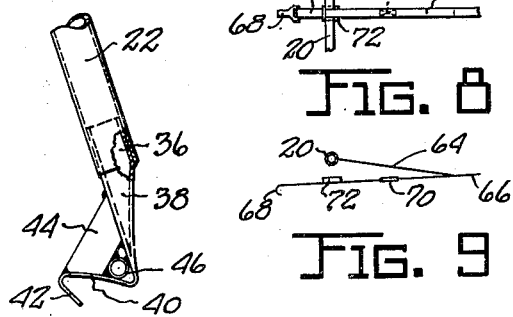
Fig. 7
Fig. 9
INVENTOR.
RUSSELL A. HUMPHREY
BY
Oltsch + Knoblock
ATTORNEYS Jan. 9, 1951 R. A. HUMPHREY 2,537,587
LUGGAGE CARRIER FOR AUTOMOBILES
Filed Jan. 16, 1948 2 Sheets-Sheet 2
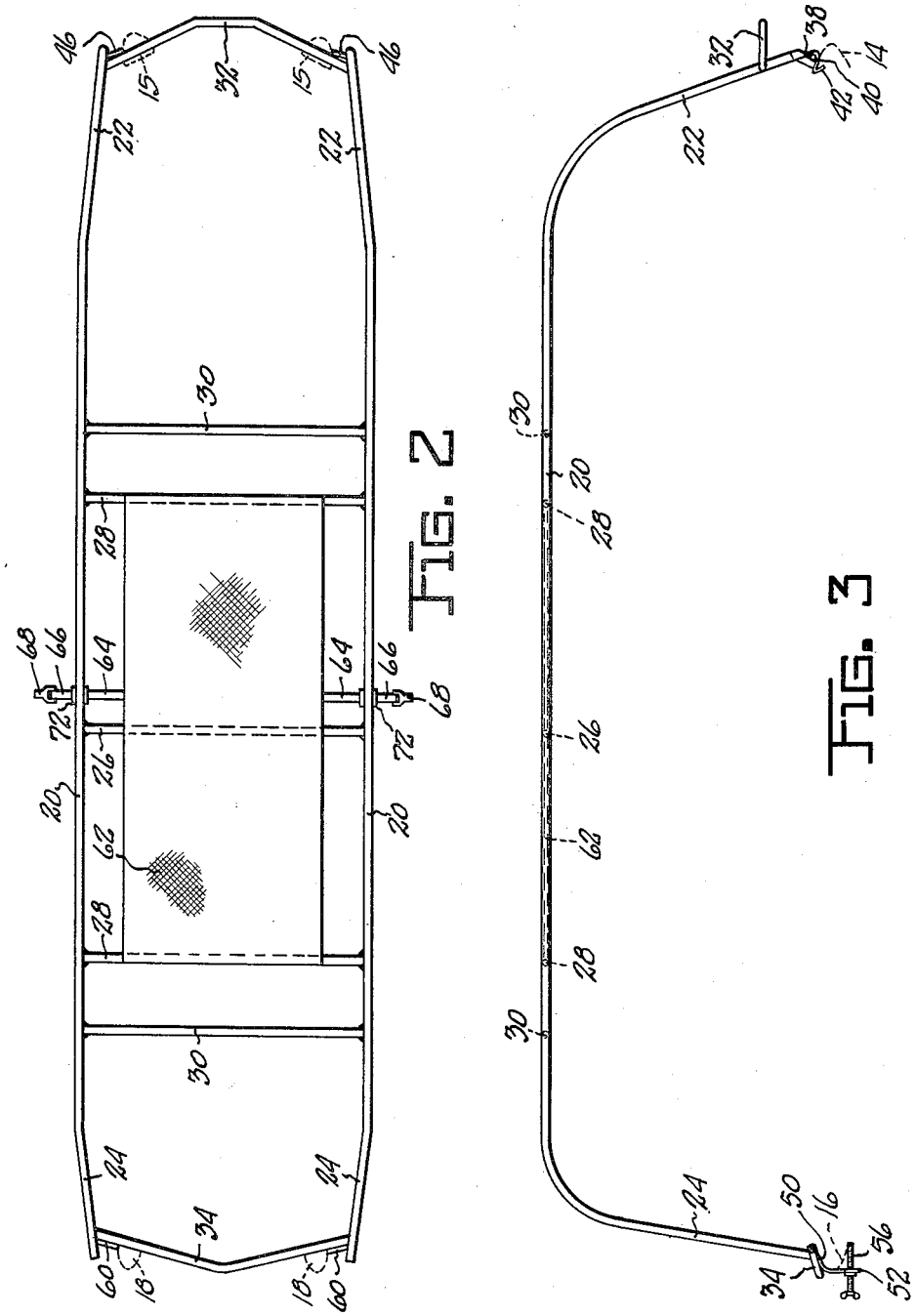
INVENTOR.
RUSSELL A. HUMPHREY
BY
Oltsch & Knoblock
ATTORNEYS.

Patented Jan. 9, 1951

2,537,587

UNITED STATES PATENT OFFICE 2,537,587

LUGGAGE CARRIER FOR AUTOMOBILES

Russell A. Humphrey, South Bend, Ind.

Application January 16, 1948, Serial No. 2,695

13 Claims. (Cl. 224—42.03)

This invention relates to improvements in luggage carriers for automobiles, and more particularly to a carrier for mounting luggage at a position above the top of an automobile.

The primary object of this invention is to provide a device of this character which is anchored and supported at the front and rear bumpers of an automobile in a manner permitting easy and ready application of the carrier to the automobile and removal of the carrier from the automobile without danger of damaging the surface finish of the automobile, and which is constructed to substantially avoid interference and obstruction of the driver's line of vision.

A further object is to provide a device of this character with a rigid lightweight frame of inverted U-shape supported at its ends on the front and rear automobile bumpers and cooperating with and held against lateral displacement by bumper guard brackets and by retainer members carried at an intermediate part thereof and having detachable hooked engagement with the automobile body, said frame being spaced above the automobile body.

A further object is to provide a device of this character which is simple in construction, inexpensive, easy to handle, which has a capacity for carrying a large quantity of luggage, and which can be applied to an automobile without requiring the use of special fittings permanently mounted or attached upon the automobile.

A further object is to provide a device of this character which is of elongated inverted U-shape adapted to engage and be supported at its ends by the front and rear bumpers of an automobile, wherein one end thereof has a hook portion having an interlocking engagement with one bumper, and the other end has a crossbar bearing on the bumper inwardly of the bumper guard brackets and a portion projecting below the level of the bumper and mounting a retainer adapted to engage the bottom of the bumper to lock the last named end of the carrier in operative position upon the bumper.

Other objects will be apparent from the following specification.

In the drawing:

Fig. 1 is a side view illustrating the application of my luggage carrier to an automobile shown in dotted lines.

Fig. 2 is a top plan view of the luggage carrier.

Fig. 3 is a side view of the luggage carrier.

Fig. 4 is an end view illustrating the manner in which one end of the device cooperates with guard brackets mounted upon the automobile bumper.

Fig. 5 is an end view taken at the opposite end of the luggage carrier.

Fig. 6 is an enlarged detail view illustrating the construction of the end portion of the carrier located at the left in Fig. 3.

Fig. 7 is an enlarged detail view illustrating the construction of the end of the carrier shown at the right in Fig. 3.

Fig. 8 is a fragmentary top plan view illustrating the construction of a retainer strap utilized in the device.

Fig. 9 is a schematic end view of the strap arrangement shown in Fig. 8.

Referring to the drawings which illustrate the preferred embodiment of the invention, the numeral 10 designates an automobile having a top body portion 12, a front bumper 14 and a rear bump 16 which mounts spaced upwardly projecting bumper guard brackets 18 in the manner well understood in the art. The automobile may be of any desired make and construction and of any style or model.

My improved luggage carrier comprises a rigid elongated frame preferably formed of metal tubular material although it may be formed of any other structural members of lightweight metal having a cross-sectional shape to impart rigidity thereto. The frame comprises a pair of elongated rigid side members 20 whose central portions are substantially straight and arranged in parallel relation spaced apart a distance less than the width of the body of the automobile. Each of these frame members 20 has a downwardly forwardly inclined front end portion 22 whose length is sufficient to position the front end of the central part of the longitudinal frame members 20 at a level above the level of the automobile top 12 when the lower ends thereof bear upon one of the bumpers of the automobile. The end parts 22 preferably incline downwardly and inwardly, as best seen in Fig. 5, so as to engage the bumper, here shown as the front bumper, in inwardly spaced relation to the ends thereof. The rear end of each of the longitudinal frame members t r-minates in a downwardly rearwardly inclined portion 24 adapted to bear against the opposite bumper and of such length that when engaging said bumper it cooperates with the front end member supported at the opposite end bumper to hold the elongated members 20 substantially in horizontal position.

The frame is provided with a plurality of reinforcing rigid crossbars interconnecting the longitudinal members above described. As here illustrated, these crossbars include a central transverse bar 26 welded or otherwise fixedly secured at its opposite ends to the central portion of the longitudinal member 20, a pair of rigid crossbars 28 welded or fixedly secured at their ends to the members 20 on opposite sides of the central crossbar 26, and a pair of rigid crossbars 30 fixedly secured at their opposite ends to the central portion 20 of the frame adjacent the bends in said longitudinal member and outwardly of the crossbars 28. In spaced relation to and above the lower ends of the frame members 22 is secured a crossbar 32 welded or otherwise suitably secured to said frame members 22. This frame member 32 may be of any configuration desired, and as here illustrated is of bent form to project longitudinally beyond the frame members 22 at its center. This member 32 may provide, in addition to its function to reinforce and rigidify the frame, a hand grip portion conveniently accessible for manipulation of the frame. The lower or free end portions 24 of the frame may be interconnected similarly by a rigid crossbar 34 which is preferably bent to a shape conforming with the contour or longitudinal curvature of the rear bumper 16. This rear crossbar 34 likewise provides a hand grip portion, by means of which the frame may be grasped to manipulate the same. In the preferred arrangement of the parts, the member 34 will bear upon the rear bumper 16 adjacent its ends and will engage the front edges of the bumper guard brackets 18 upon said rear bumper.

The rigid frame constructed as above described is so shaped and proportioned that the central portion 20 of the longitudinal frame members and the crossbars 26, 28 and 30 will all lie and be positioned spaced above the top 12 in a substantially horizontal plane, and the end members 22 and 24 and the cross-members 32 and 34 will be positioned longitudinally outwardly from the body of the automobile and are permitted to engage only the bumpers 14 and 16 and the bumper guard brackets upon said bumpers. In this connection it will be understood that the front bumper 16 may be provided with vertical bumper guard brackets 15 of the type and construction well understood in the art, as shown herein in Fig. 2.

The lower ends of the longitudinal frame members 24 mount hook-shaped brackets of any suitable construction. One construction of such brackets which is particularly suitable for use with a front automobile bumper of the type now common in the art, i. e. a bumper of U-shape in cross-section having its leg portions extending substantially horizontally as best illustrated in Fig. 3 by the numeral 14, is illustrated in Fig. 7. This bracket has a portion 36, here illustrated as tubular in form, fitting within and fixedly secured to the lower end of the frame part 24. A leg portion 38 depends from the portion 36 and is transversely bent to provide a strong rigid structure. From the lower end of the portion 38 projects a rearwardly extending part 40 which is preferably substantially flat transversely but may be curved along its length to substantially conform to the contour of the upper portion of the bumper 14 upon which it is adapted to bear. A forwardly downwardly inclined rigid flange portion 42 projects from the rear end of the portion 40, being adapted to hook around the upper rear edge portion of the bumper 14. To rigidify and strengthen the brackets shown in Fig. 7, one or more plates 44 may extend diagonally between the portions 38 and 40 of said bracket and be welded thereto. The plates 44 preferably terminate spaced from the V at which the parts 38 and 40 merge, and within this V may be positioned a short tubular cross-member 46, best illustrated in Fig. 5. The tubular members 46 extend transversely of the bracket part 38 and are welded at their outer end portions to bracket parts 38, 40, 44, as best shown in Fig. 7. Tubular parts 46 project inwardly from the brackets 38, as illustrated in Fig. 5, and are of such length that the spacing between the inner ends thereof will substantially conform to the spacing between the outer surfaces of bumper guard brackets 15 mounted upon the bumper 14, for example, the front bumper. In cases where the spacing of said front bumper guards 15 is greater than the spacing between the brackets 38, it will be obvious that said tubular members 46 will project outwardly to engage said bumper guards 15 at their outer ends.

The construction best illustrated in Figs. 5 and 7 provides for support of the front end of the luggage carrier by direct bearing engagement of the parts 40 of the brackets 38 upon the upper surface of the bumper 14 with the hook portions 42 of said brackets 38 preventing longitudinal forward displacement of the luggage carrier relative to the bumper. The tubular members 46 projecting laterally from the brackets 38 prevent lateral displacement of the luggage carrier relative to the bumper. In this way the brackets 38 insure that the end of the carrier mounting said brackets may be applied to operative position with a simple quick manipulation and without requiring any manipulation or tightening of securing members. It will be observed that the hook prevents both longitudinal upward and downward movement of the end of the luggage carrier frame mounting the same and that the tubular members 46 prevent lateral movement of the end of the frame.

The opposite end portions 24 of the longitudinal frame members terminate in a construction best illustrated in Fig. 6. The frame parts 24 are rearwardly offset at 48 to provide an inclined surface 50 which is adapted for flat bearing engagement with the upper face of the rear bumper 16 outwardly spaced from the rear bumper guard 18. The members 24 terminate in a vertical rearwardly offset portion 52 which projects downwardly to a level below the level of the rear bumper 16 and mounts an internally screwthreaded socket member 54 adapted to receive an elongated screw-threaded member 56 projecting longitudinally of the frame and terminating at its outer end in an enlarged hand grip member 58 by which it may be rotated in the socket 54. The inner end of the threaded member 56 is adapted to engage the front lower edge of the bumper 16, as best illustrated in Fig. 3. It will be apparent, therefore, that when the surface 50 bears upon the rear bumper, the member 56 engages the lowermost portion of said bumper and the frame member 34 engages forwardly of the bumper guard brackets 18 as illustrated in Fig. 4, and the rear end portion of the luggage carrier frame will be held to the bumper against longitudinal, upward or downward movement. Short rigid members 60, as best illustrated in Fig. 2, project inwardly from the lower ends of the members 24 and are adapted for engagement at their inner ends with the bumper guard brackets 18 and thus cooperate to prevent lateral displacement of the rear end of the frame relative to the automobile.

It will be apparent from this construction that, if the parts are so constructed that the normal spacing of the free ends of the frame members 22 and 24 is slightly greater than that required to engage the parts of the front and rear bumpers as mentioned above, such members must be slightly tensioned to apply the frame crossbar 34 in front of the rear bumper guards 34 after the hook 42 has first engaged the front bumper 14. This will place the frame under a slight tension and will guard against vibration of the frame relative to the automobile body.

An article carrier 62, such as a wide fabric web or a wire mesh screen, is mounted on the upper central portion of the luggage carrier by any suitable means. As here illustrated, the opposite ends of said web or screen 62 are anchored to the cross-members 28 and the central portion thereof overlies and may be secured to the cross-member 26. If desired, longitudinal reinforcing and supporting members (not shown) may be secured to the longitudinal side edges of the web or screen 62. The web or screen 62 will preferably be located either in the plane of the member 20 or thereabove so as to insure clearance between the same and the top 12 of the automobile when the device is mounted in operative position upon the automobile.

Although the construction of the frame and its connection with the bumpers of the automobile insures firm anchoring of the frame and prevents lateral displacement thereof, it may be desirable because of the length of the carrier to provide means intermediate the length thereof for stabilizing the central portion of the carrier. Such means are best illustrated in Figs. 2, 5, 8 and 9 and may comprise strong fabric webs or leather straps 64 anchored fixedly at their outer ends to the central portion of the longitudinal frame members 20 and anchored or secured at their inner ends to an elongated transverse strap 66 which completely spans the top of the automobile. The ends of the strap 66 preferably mount hook-shaped brackets 68 which are adapted to engage portions of the automobile body. In this connection it is conventional in automobile construction to provide outwardly projecting gutter members (not shown) extending above the doors at the sides of the top of an automobile, and the hooks 68 are so constructed that they will engage said gutter members. The strap 66 is extensible, being provided with a buckle 70 so that the strap 66 may be drawn taut when the hooks 68 at the opposite ends thereof engage the gutters at the opposite sides of the automobile body. If desired, the straps 66 may also mount pads 72 which are positioned directly below the frame members 20 and which act as bumpers to prevent direct engagement of the members 20 with the top of the automobile against which the strap 64 bears in cases where the automobile travels over rough roads occasioning substantial vibration and resultant swaying movement of the elongated frame parts 20.

It will be apparent from the foregoing description that this device does not require the use of any fittings or fixtures which must be fixedly secured to the automobile body for its mounting. Instead, the device is constructed with parts which engage detachably with standard elements of an automobile, such as the bumpers or bumper guard brackets and the gutter channels of the automobile body. This eliminates all necessity for special machining or mechanical operation upon the automobile. At the same time all attachment parts for this device are readily accessible, the primary attachment parts being located conveniently adjacent the fenders so that they may be manipulated without difficulty. The only actual manipulation required, aside from the manipulation of the frame itself to properly relate it to the bumpers, is to tighten the screw-threaded members 56 and the buckle 70 of the strap 66. Each of these manipulations can be performed by hand without requiring the use of tools. The handling of the frame is rendered simple by the provision and convenient location of the crossbars 32 and 34 at the opposite ends of the frame. Consequently, two people can apply or remove the luggage carrier. Each person grasps one end of the frame of the luggage carrier, the party holding the end mounting the bracket 38 engaging the hook 42 of that bracket with the bumper, and the party holding the opposite end of the frame then pushing inwardly against the frame to permit the crossbar 34 to pass forwardly of the rear bumper guards 18. Thereupon the members 56 may be manipulated to project them inwardly to a position below the bumper, it being understood that during the application of the frame to the automobile the members 56 must be retracted so that the inner end thereof will clear the outer surface of the bumper 16.

The luggage carrier, being anchored only at the bumpers and the gutters, does not interfere with the opening and closing of the vehicle doors nor with the movement of a person through the door openings to enter or get out of the automobile. The extension of the frame to engage the bumpers positions the parts forwardly and rearwardly of the passenger compartment of the body of the automobile, but these parts are of small cross-sectional size and, therefore, their location does not interfere to any substantial or objectionable extent with the vision of the driver or other occupants of the car either forwardly or rearwardly.

While the preferred construction of the luggage carrier has been illustrated and described herein, it will be understood that changes may be made therein within the scope of the appended claims without departing from the spirit of the invention.

I claim:

1. A luggage carrier adapted to be mounted on an automobile having a body and bumpers provided with upwardly projecting bumper guards, comprising a rigid frame including a pair of elongated inverted U-shaped rigid members and rigid cross-members fixedly secured to said elongated members, a hook member mounted on one end of each elongated member and adapted for hooked engagement with the inner upper edge portion of one bumper, the opposite end of said frame including a portion adapted to bear upon the other bumper inwardly of the bumper guards thereon, the central portion of said frame being spaced above the top of said automobile body, and a luggage supporting member spanning and carried by said central frame portion, said frame being of a length to normally space said hook members and the bumper guard engaging portions a distance slightly greater than the spacing between the inner edge of one bumper and the inner edges of the bumper guards on the other bumper, whereby said frame is placed in compression when mounted upon an automobile.

2. A luggage carrier adapted to be mounted on an automobile having a body provided with gutter channels at the opposite sides of the top thereof and front and rear bumpers mounting bumper guards, comprising a rigid elongated frame of inverted U-shape and including a central substantially horizontal portion and substantially upright end portions, a luggage support carried by said central portion, laterally spaced hook members carried by one end portion of said frame and bearing upon one bumper and having hooked engagement with the inner marginal portion of said bumper, the opposite end of said frame bearing upon the other bumper and including a transverse portion engaging the inner edges of the bumper guards mounted on the last named bumper, a retainer carried by the last named end of said frame and engaging the bottom of said last named bumper, and stabilizer means anchored to the central portion of said frame and including flexible portions projecting laterally from the frame and mounting hooks engaging said gutter channels.

3. A luggage carrier adapted to be mounted on an automobile having a body provided with gutter channels at the opposite sides of the top thereof and front and rear bumpers mounting bumper guards, comprising a rigid elongated frame of inverted U-shape and including a central substantially horizontal portion and substantially upright end portions, a luggage support carried by said central portion, hook members on one end of said frame supported by one bumper and interlocking with the inner margin thereof, terminal portions on the opposite end of said frame providing shoulders bearing on the other bumper, transverse portions bearing against the inner edges of the adjacent bumper guards and a retractible lock portion engaging the bottom of said last named bumper, and a retainer carried by the central portion of said frame and including hooks engaging the gutter channels at opposite sides of the automobile.

4. A luggage carrier adapted to be mounted on an automobile having a body provided with gutter channels at the opposite sides of the top thereof and front and rear bumpers mounting bumper guards, comprising a rigid elongated frame of inverted U-shape and including a central substantially horizontal portion and substantially upright end portions, a luggage support carried by said central portion, hook means on one end of said frame adapted to bear upon one bumper and to interlock with the inner margin thereof, hook means on the other end of said frame adapted to bear upon the other bumper and to interlock therewith, said last named hook means including a retractible locking part and a part engaging an inner edge of the unit including said last named bumper and the bumper guards thereon, a strap adapted to extend transversely across the top of the automobile body and mounting hooks at its ends engaging said gutter channels, and connectors secured to said frame and to said strap to restrain said strap and frame against relative transverse movement.

5. A luggage carrier adapted to be mounted on an automobile having a body and front and rear bumper units including bumper guard brackets, comprising an elongated rigid frame having upright end portions each adapted to bear upon one of said bumpers and a central substantially horizontal portion positioned above the automobile body, hook members carried by the lower ends of said frame end portions and engaging said bumper units to restrain said frame against vertical and longitudinal movement relative to said automobile, and abutment members carried by the ends of said frame and bearing against said bumper guards to restrain said frame against movement transversely of said automobile.

6. A luggage carrier adapted to be mounted on an automobile having a body and front and rear bumper units including bumper guard brackets, comprising an elongated rigid frame having upright end portions each adapted to bear upon one of said bumpers and a central substantially horizontal portion positioned above the automobile body, hook members carried by the lower ends of said frame end portions and engaging said bumper units to restrain said frame against vertical and longitudinal movement relative to said automobile, and abutment members carried by the ends of said frame and bearing against said bumper guards to restrain said frame against movement transversely of said automobile, one of said hook members constituting a rigid bracket fixedly secured to the end of said frame and projecting therebelow, said bracket having an intermediate inwardly projecting portion providing a shoulder adapted to bear upon the upper surface of one bumper and an outwardly downwardly inclined terminal portion adapted for hooked engagement with the upper inner marginal portion of said bumper.

7. A luggage carrier adapted to be mounted on an automobile having a body and front and rear bumper units including bumper guard brackets, comprising an elongated rigid frame having upright end portions each adapted to bear upon one of said bumpers and a central substantially horizontal portion positioned above the automobile body, hook members carried by the lower ends of said frame end portions and engaging said bumper units to restrain said frame against vertical and longitudinal movement relative to said automobile, and abutment members carried by the ends of said frame and bearing against said bumper guards to restrain said frame against movement transversely of said automobile, one of said hook members constituting a rigid bracket fixedly secured to the end of said frame and projecting therebelow, said bracket having an intermediate inwardly projecting portion providing a shoulder adapted to bear upon the upper surface of one bumper and an outwardly downwardly inclined terminal portion adapted for hooked engagement with the upper inner marginal portion of said bumper, said abutment member being secured to said bracket adjacent to and above the forward end of said intermediate shoulder portion.

8. A luggage carrier adapted to be mounted on an automobile having a body and front and rear bumper units including bumper guard brackets, comprising an elongated rigid frame having upright end portions each adapted to bear upon one of said bumpers and a central substantially horizontal portion positioned above the automobile body, hook members carried by the lower ends of said frame end portions and engaging said bumper units to restrain said frame against vertical and longitudinal movement relative to said automobile, and abutment members carried by the ends of said frame and bearing against said bumper guards to restrain said frame against movement transversely of said automobile, one of said hook members including a rigid part depending from an upright frame end portion and offset therefrom to define a shoulder bearing upon a bumper, and a retractible locking member carried by said offset part and engaging the bottom of said bumper.

9. A luggage carrier adapted to be mounted on an automobile having a body and front and rear bumper units including bumper guard brackets, comprising an elongated rigid frame having upright end portions each adapted to bear upon one of said bumpers and a central substantially horizontal portion positioned above the automobile body, hook members carried by the lower ends of said frame end portions and engaging said bumper units to restrain said frame against vertical and longitudinal movement relative to said automobile, and abutment members carried by the ends of said frame and bearing against said bumper guards to reestrain said frame against movement transversely of said automobile, said frame including crossbars at its ends providing hand grips, one of said crossbars engaging the inner surface of the bumper guards of one bumper unit.

10. A luggage carrier adapted to be mounted on an automobile having a body and front and rear bumper units including bumper guard brackets, comprising an elongated rigid frame having upright end portions each adapted to bear upon one of said bumpers and a central substantially horizontal portion positioned above the automobile body, hook members carried by the lower ends of said frame end portions and engaging said bumper units to restrain said frame against vertical and longitudinal movement relative to said automobile, and abutment members carried by the ends of said frame and bearing against said bumper guards to restrain said frame against movement transversely of said automobile, at least one of said hook members including a retractible part for interlocking engagement with the adjacent bumper.

11. The combination with a vehicle having a body and at least one bumper, of a luggage carrier comprising a rigid frame including a pair of elongated inverted U-shaped rigid members and rigid cross-members fixedly secured to said elongated members, hook members carried by said U-shaped members at one end of said frame and each including a bearing portion resting on a bumper and a terminal portion having hooked engagement with said bumper, means for supporting and releasably connecting the opposite end of said frame to said vehicle spaced from the bumper engaged by said hook members a distance different than the normal spacing of said hook members from the opposite end of said frame whereby said U-shaped members are longitudinally stressed, the central portion of said frame being spaced above said vehicle body, and a luggage supporting member spanning and carried by said central frame portion.

12. The construction defined in claim 11, wherein said bumper mounts a pair of spaced upwardly projecting bumper guards, and said hook members each includes a part engaging one of said bumper guards to position said hook members in predetermined position lengthwise of said bumper.

13. The combination with an automobile having a body and at least one bumper, of a luggage carrier comprising a rigid frame including a pair of fixedly interconnected spaced inverted U-shaped members and a luggage supporting member carried by the intermediate portion of said frame, and means for supporting and connecting the opposite ends of said frame to said automobile at points spaced a distance different than the normal spacing between the opposite ends of said frame whereby said frame is stressed longitudinally, said means at one end of said frame constituting hooks carried by said U-shaped members and each having a bearing portion supported by said bumper and a terminal portion in hooked engagement with said bumper.

RUSSELL A. HUMPHREY.

REFERENCES CITED

The following references are of record in the file of this patent:

UNITED STATES PATENTS

| Number | Name | Date |
| --- | --- | --- |
| 2,180,032 | Casley | Nov. 14, 1939 |
| 2,357,203 | Jimmes | Aug. 29, 1944 |